Patented June 15, 1943

2,322,148

UNITED STATES PATENT OFFICE 2,322,148

METHOD OF MAKING CHEDDAR CHEESE

Clarence B. Lane and Bernard W. Hammer, Ames, Iowa, assignors to Iowa State College Research Foundation, Ames, Iowa, a corporation of Iowa No Drawing. Application April 22, 1940, Serial No. 330,994

6 Claims. (Cl. 99—116)

Our invention relates to cheddar cheese made with lipolytic enzymes, obtained, for example, from mammary tissue, and to the method of making cheddar cheese, employing such ingredients.

Our invention involves adding lipase (lipolytic) enzymes which may be provided in mammary tissue, or extract thereof, to the milk intended for cheese.

Cheddar cheese produced by our method, where lipolytic enzymes have been added to the milk, has a substantially improved body, texture and flavor.

When the ingredient mentioned is added to the milk intended for cheese, the development of flavor is speeded up and the ripening period is shortened.

Our invention consists of the method hereinafter described, and of the product resulting therefrom.

Our work has been concerned primarily with changes taking place in the fat of cheddar cheese. Data now assembled indicate that, contrary to general opinion, a limited breakdown of fat in the cheese during the ripening results in the formation of certain compounds which contribute to the characteristic "cheddar" flavor.

The changes in the fat apparently involve hydrolysis, whereby a portion of the fat forms limited quantities of free fatty acids. We are of the opinion that such compounds, in the correct proportions, contribute to the typical flavor of cheddar cheese.

Fat hydrolysis in a dairy product usually results in a rancid flavor and aroma, due principally to the liberation of butyric and other acids. Hydrolysis of fat in cheese does not normally result in a rancid condition. There is some evidence that the butyric acid is destroyed by certain microorganisms as rapidly as formed, while fatty acids higher in the series are not destroyed, but accumulate in the cheese (particularly in the fat) to produce a desirable flavor.

It is probable that the disappearance of butyric acid is facilitated by its high solubility in water, as compared with the more complex fatty acids. Since the degree of hydrolysis in fat may be determined in a general way by the acid number, values were obtained on fat from various samples of ripened cheese and compared with values on fresh butter fat. The acid numbers on fat from ripened cheese were regularly higher than those on fresh butter fat.

The desirable hydrolysis of fat in cheddar cheese is evidently brought about largely by the enzyme "lipase" normally present in milk. Since proper pasteurization of milk completely destroys milk lipase, the acid numbers on fat from pasteurized milk cheese should be considerably lower than those on fat from raw milk cheese; values obtained by experiments and tests on the fats from the two types of cheese (made respectively from raw and from pasteurized milk) show this to be true. It has been found that pasteurized milk cheese commonly lacks flavor, even after extended ripening.

Yet pasteurization of milk for cheese making is necessary in certain localities to control the growth of undesirable organisms, especially types which produce a "gassy" condition in the cheese. In some localities the laws for the protection of public health require pasteurization of milk used for cheese-making. We find that when pasteurized milk is used in connection with our method as described below, the flavor of the resulting cheese is improved even over that of cheese made from unpasteurized milk.

Suitable means of speeding up the hydrolysis of fat in cheddar cheese, especially with cheese from pasteurized milk, should be of commercial importance since a relatively rapid development of flavor definitely shortens the ripening period.

In experiments, the hydrolysis of fat in cheddar cheese was speeded up by the addition of mammary tissue or extract thereof as explained below. Since the early trials indicated that more beneficial results were obtained when pasteurized milk was employed for cheese-making rather than raw milk, most of the trials were made with pasteurized milk. For pasteurization, the milk was heated to 145° F. (62.8° C.) and held 30 minutes.

The following procedure for the manufacture of cheddar cheese was employed in practicing our invention.

The portions of milk were placed in 40 gallon cheese vats and inoculated with 1.5 or 2.0 per cent of commercial cheese culture. The cultures used were of the type that produce acid rapidly and, at the time of their inoculation into the milk, contained from 0.8 to 0.9 per cent acid, calculated as lactic acid. After the temperature of the milk had been adjusted to 86° F. (30.0° C.), cheese color was added at the rate of 1 ounce per 1,000 lbs. of milk. Then mammary tissue or extract was added. Mammary tissue was prepared from the mammary glands of cows, sheep or goats by first washing the very fresh glands with salt water, then drying the material, and finally pulverizing it. Extracts of the glands were prepared by agitating the pulverized material with water, 10% salt solution or 1% aqueous lactic acid for several hours in a closed container. For the extracts, 50 grams of powdered tissue were usually used with 500 milliliters of the extracting liquid. Good results were obtained in cheese by adding 200 milliliters of extract or 25 grams of the pulverized material to 1000 pounds of milk. The tissue or extract may be added to the milk for cheese-making, as described above, or to the cheese before the curd is placed in hoops.

Then rennet extract was added at the rate of 3 ounces per 1000 pounds of milk. About 7 minutes after the addition of the rennet the milk began to coagulate, and about 20 to 25 minutes later the curd was ready to cut; three-sixteenth inch knives were used for this purpose.

The curd was cooked at 104° F. (40.0° C.) until the acidity of the whey reached 0.15 to 0.16 per cent and the desired firmness of the curd was obtained. After dipping, the curd was cheddared until 0.5 to 0.6 per cent acidity in the whey was reached or until the curd produced 0.5 to 0.75 inch threads on the hot iron. After milling, the curd was forked for about 30 minutes and 3 per cent cheese salt added. At least 45 minutes were required to completely dissolve the salt, after which the curd was rinsed with scalding water and then placed in the hoops.

The cheese was pressed for about 18 hours under continuous pressure and then placed in a curing room. One longhorn cheese weighing about 12 pounds was obtained from each lot of 127 pounds of milk.

Cheese made from milk containing mammary tissue or extracts of the tissue were regularly of higher quality than cheese made from milk not containing the materials. This was especially noticeable when pasteurized milk was employed. The following table gives the scores on the cheese in four comparisons after three months of ripening. The cheese were made from pasteurized milk.

| Cheese No. | Treatment of milk | Score on cheese after 3 months' ripening | |
|---|---|---|---|
| | | Body and texture | Flavor |
| SERIES 1 | | | |
| 1-1 | Nothing added | 28½ | 39 |
| 1-2 | Mammary tissue added | 29 | 39½ |
| SERIES 2 | | | |
| 2-1 | Nothing added | 28 | 39 |
| 2-2 | Mammary tissue added | 29 | 39½ |
| SERIES 3 | | | |
| 3-1 | Nothing added | 28 | 39 |
| 3-2 | Mammary extract added | 29 | 40 |
| SERIES 4 | | | |
| 4-1 | Nothing added | 28 | 38½ |
| 4-2 | Mammary extract added | 29 | 39½ |

The data show that the addition of mammary tissue or extracts of the tissue to the milk used for cheese-making improved the body and texture of the cheese as well as the flavor. This is due, presumably, to the beneficial action in the cheese ripening brought about by certain enzymes, particularly lipase, contained in the tissue. When relatively large amounts of tissue or tissue extract are employed, the cheese becomes slightly rancid in the early stages of ripening. This rancidity, however, disappears rather quickly.

Furthermore, by the practice of the method explained, the ripening period is substantially shortened.

It is our purpose to cover by our claims any variation in the details of the method which may reasonably come within their scope and the scope of our invention.

We claim as our invention:

1. The method of making cheddar cheese in which lipolytic enzyme obtained from mammary tissue, is added to the other ingredients during the process of manufacture.

2. The method of making cheddar cheese, in which mammary tissue obtained from mammary glands of milk producing animals is added to the milk used for the cheese-making.

3. The method of making cheddar cheese including the step of adding to the ingredients, pulverized mammary tissue in approximately the proportions of 25 grams of tissue to 1000 pounds of milk.

4. The method of making cheddar cheese including the step of adding to the ingredients, extract of mammary tissue in approximately the proportions of 200 milliliters of extract to 1000 pounds of milk.

5. The method of making cheddar cheese, in which lipolytic enzymes obtained from mammary tissue, are added to the other ingredients during the process of manufacture.

6. The process of making cheddar cheese which comprises adding lipolytic enzymes obtained from mammary tissue to the cheese before the curd is placed in hoops.

CLARENCE B. LANE.
BERNARD W. HAMMER.